United States Patent [19]

Ishikawa

[11] Patent Number: 4,840,241
[45] Date of Patent: Jun. 20, 1989

[54] LETTER SCALE WITH COIN COUNTER-BALANCE

[76] Inventor: Takeshi Ishikawa, 420 E. 80th St., Suite 8L, New York, N.Y. 10021

[21] Appl. No.: 252,635

[22] Filed: Oct. 3, 1988

[51] Int. Cl.$^4$ .................... G01G 23/14; G01G 1/18
[52] U.S. Cl. .................................. 177/172; 177/251
[58] Field of Search ............... 177/148, 171, 172, 216, 177/251, 252

[56] References Cited

U.S. PATENT DOCUMENTS

| | | | |
|---|---|---|---|
| 1,126,398 | 1/1915 | Cleophas | 177/251 X |
| 3,224,516 | 12/1965 | Stelzer | 177/172 |
| 3,365,011 | 1/1968 | Heil | 177/172 |
| 3,454,120 | 7/1969 | Peterson | 177/251 X |
| 3,599,738 | 8/1971 | Wickenberg | 177/216 X |
| 4,792,002 | 12/1988 | Ward | 177/251 X |

*Primary Examiner*—George H. Miller, Jr.
*Attorney, Agent, or Firm*—Frank J. Jordan; C. Bruce Hamburg; Manabu Kanesaka

[57] ABSTRACT

A coin scale for measuring weight of a mailing material comprises a scale section and a base section situated under the scale section. The scale section includes an elongated arm, a coin receiving member formed at one end of the arm, a mail receiving member formed at the other end of the arm, and a first supporting device situated between the coin receiving member and the mail receiving member. The first supporting device is provided with a plurality of supporting points. The base section include a stand and a second supporting device formed on the stand. The second supporting device rotatably engages one of the supporting points and supports the arm as a fulcrum of a balance. In at least one supporting point, weight at the mail receiving member increases step by step corresponding to the particular weight zone of a mailing material as one coin is added in the coin receiving member.

9 Claims, 1 Drawing Sheet

LETTER SCALE WITH COIN COUNTER-BALANCE

BACKGROUND OF THE INVENTION AND RELATED ART STATEMENT

The present invention relates to a coin scale, more particularly, a scale for measuring weight of a mailing material by using coins.

In measuring weight of a mailing material, such as a letter, there have been proposed a various kind of scales. One conventional method is to measure actual weight of a mailing material. However, instead of measuring actual weight, weight range for a mailing material may be measured by using weights.

In determining weight range or limit of weight of a mailing material, a weight in a scale may be moved, or weights may be added to or removed from a scale. In a scale of a type using predetermined weights, predetermined weights must be added to a scale if necessary. In this case, if the weight is lost, new weight must be obtained. Therefore, this type of scale is not generally preferred.

The present invention utilizes weights for measuring weight of a mailing material. However, the weights used in the scale of the present invention are coins, such as 25 cent coins, so that special weight need not be required in the coin scale of the present invention.

Accordingly, one object of the present invention is to provide a coin scale, which can be easily utilized.

Another object of the present invention is to provide a coin scale as stated above, which is small and simple to use.

Further objects and advantages of the present invention will be apparent from the following description of the invention.

SUMMARY OF THE INVENTION

In accordance with the present invention, a coin scale for measuring weight of a mailing material is provided. The coin scale comprises a scale section and a base section situated under the scale section to support the same.

The scale section comprises an elongated arm, a coin receiving member formed at one end of the arm, a mail receiving member formed at the other end of the arm, and a first supporting device situated between the coin receiving member and the mail receiving member. The first supporting device is provided with a plurality of supporting points, wherein one of the supporting points is supported by the base section.

The base section comprises a stand, and a second supporting device formed on the stand. The second supporting device rotatably or pivotally engages one of the supporting points of the first supporting device and supports the elongated arm as a fulcrum of a balance. In at least one supporting point, weight at the mail receiving member which corresponds to the particular weight zone of a mailing material increases step by step as one coin is added to the coin receiving member.

A level for measuring a horizontal level of the arm may be attached to the arm. The level is, preferably, an air liquid type containing air and liquid in a container. As a result, balance of the arm can be precisely read.

DETAILED DESCRIPTION OF PREFERRED EMBODIMENTS

Figure 1:
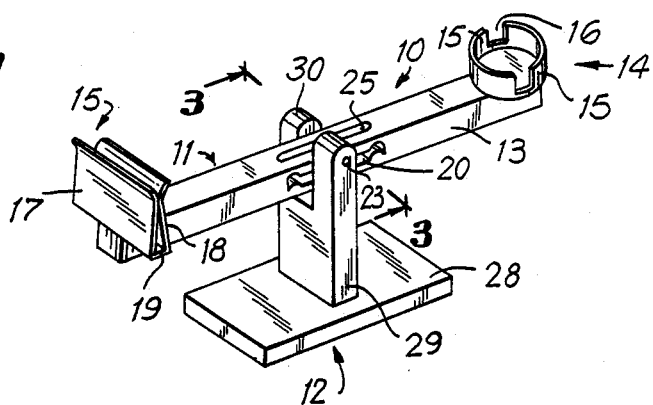
FIG. 1 is a perspective view of a first embodiment of a coin scale in accordance with the present invention.
Figure 2:
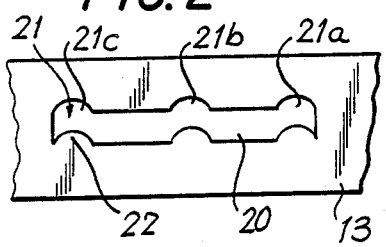
FIG. 2 is an enlarged side view of a part of an arm of the coin scale of the invention.
Figure 3:
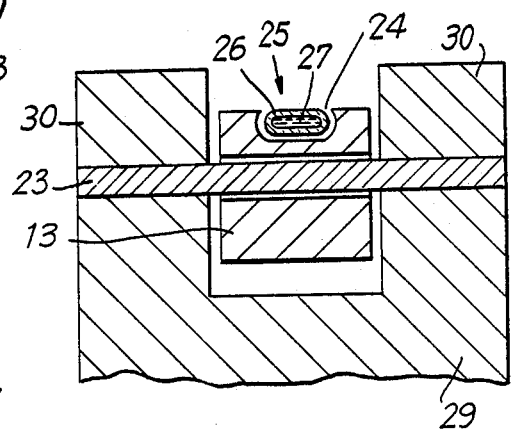
FIG. 3 is an enlarged section view along line 3—3 in FIG. 1.

Referring to FIGS. 1-3, a first embodiment 10 of a coin scale of the present invention is shown. The coin scale 10 comprises a scale section 11, and a base section 12 for supporting the scale section 11 as a fulcrum.

The scale section 11 comprises an elongated arm 13 having a coin receiving portion 14 and a mail receiving portion 15 at both end portions of the arm 13, respectively. The coin receiving portion 14 includes curved side walls 15 separated by notches 16. Therefore, while a coin, e.g. quarter (not shown), is retained by fingers, the coin can be easily placed into and removed from the coin receiving portion 14.

The mail receiving portion 15 comprises two side walls 17, 18, and a bottom wall 19. The upper portions of the side walls 17, 18 curve outwardly to easily receive a mailing material therein. Also, the upper portions of the side walls 17, 18 are designed to abut against each other to securely retain a mailing material therebetween.

As shown in FIG. 2, the arm 13 is provided with an elongated hole 20 therein having three dents 21 at an upper portion of the hole 20. Also, three enlarged portions 22 are formed under the dents 21. As a result, sectional areas perpendicular to the longitudinal direction of the hole 20 do not substantially change throughout the entire length of the hole 20. A rod 23 operating as a fulcrum for the arm 13 is inserted in the hole 20.

The arm 13 also includes an elongated depression 24 above the hole 20. The length of the depression 24 is substantially the same as that of the hole 20. A level 25 for measuring the horizontal level of the arm 13 is situated in the depression 24.

The level 25 comprises a container 26 and liquid 27 in the container 26, in which air is contained as well. The horizontal level is measured by the location of air in the container 26.

The weight of the level 25 is substantially the same as the weight of a material of the arm 13 where the depression 24 and hole 20 occupy. Namely, the weight at any sectional area of the arm 13 perpendicular to the longitudinal direction of the arm 13 does not substantially change throughout the entire length of the arm 13. Therefore, even if the fulcrum of the arm 13 is changed, the quality or weight of the arm 13 due to the depression 24, hole 20 and level 25 does not affect the balance of the arm.

The base section 12 comprises a bottom plate 28, and an upright member 29 attached to the bottom plate 28. The upright member 29 includes two extensions 30, between which the arm 13 is located and retained by means of the rod 23.

The location of the dents 21 is determined based on the coin to be used. Quarters (25 cent coin) are available in any places in the United States, so that it is preferable to set the dents 21 based on the weight of the quarters. However, it is possible to set the dents 21 based on any coins.

In this respect, for example, when a position 21a (FIG. 2) is selected, the arm 13 balances in case one quarter coin at the coin receiving portion 14 is equivalent to a half ounce at the mail receiving portion 15. Therefore, two quarter coins are equivalent to one ounce. Namely, one quarter coin is equivalent to a half ounce. Therefore, overseas airmail can be measured in this position.

When a position 21b is selected, the arm 13 balances in case one quarter coin at the coin receiving portion 14 is equivalent to one ounce at the mail receiving portion 15. Namely, one quarter coin is equivalent to one ounce. Therefore, first class mail can be measured in this position. Similarly, when a position 21c is selected, one quarter coin at the coin receiving portion 14 operates to be equivalent to two ounces at the mail receiving portion 15.

Figure 4:
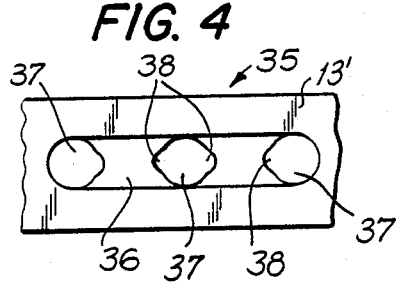
FIG. 4 is an enlarged side view of a part of an arm, similar to FIG. 2, of a second embodiment of a coin scale of the invention.
Figure 5:
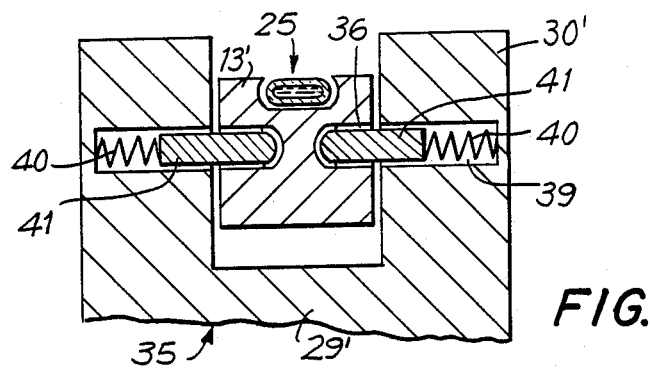
FIG. 5 is an enlarged section view, similar to FIG. 3, of the second embodiment of a coin scale of the invention.

FIGS. 4 and 5 show a second embodiment 35 of a coin scale of the present invention. The coin scale 35 is substantially the same as the coin scale 10 as explained above. However, the structure for supporting the arm 13 of the coin scale 10 is different in the coin scale 35.

Namely, an arm 13' having the coin receiving portion 14 and the mail receiving portion 15 as in the scale 10 is provided with grooves 36 at side portions thereof. Dents 37 with inclined portions 38 are formed in the grooves 36. The location of the dents 37 is determined as in the dents 21 to operate as a fulcrum of the arm 13'. Extensions 30 of an upright member 29' are provided with dents 39, into which springs 40 and pins 41 are respectively inserted.

When the coin scale 35 is assembled, the arm 13' is placed between the extensions 30', wherein the pins 41 are situated in the grooves 36 and the dents 39 to rotationally hold the arm 13' between the extensions 30'. When the location of the dents 37 relative to the pins 41 is changed, the arm 13' may be simply pulled or pushed relative to the upright member 29'.

In the coin scale 35, the location of the dents 37 is determined as in the dents 20 of the coin scale 10. The coin scale 35 operates as in the coin scale 10.

In the present invention, a mailing material can be easily measured. The coin scale of the invention is useful as a practical ornament.

While the invention has been explained with reference to the specific embodiments of the invention, the explanation is illustrative and the invention is limited only by the appended claims.

What is claimed is:

1. A coin scale for measuring weight of a mailing material, comprising:
    a scale section including an elongated arm, a coin receiving member formed at one end of the arm for supporting a plurality of coins thereon, a mail receiving member formed at the other end of the arm for supporting a mailing material to be weighed thereon, and a first supporting device formed in the arm between the coin receiving member and the mail receiving member, said first supporting device having a plurality of supporting points, said scale section being supported by one of the supporting points, and
    a base section situated under the scale section, said base section having a stand and a second supporting device formed on the stand, said second supporting device rotatably engaging one of the supporting points of the first supporting device and supporting the elongated arm as a fulcrum of a balance so that in at least one supporting point, weight at the mail receiving member which corresponds to the particular weight zone of a mailing material increases step by step as one coin is added in the coin receiving member.

2. A coin scale according to claim 1, further comprising a level attached to the elongated ar for measuring a horizontal level of the arm.

3. A coin scale according to claim 2, wherein the level comprises a hollow elongated member, liquid inside the hollow member, and air inside the hollow member.

4. A coin scale according to claim 3, wherein said elongated arm is provided with a depression for receiving the level therein, and a hollow portion as a part of the first supporting device, the weight of the depression and the hollow part of the arm is substantially the same as that of the level.

5. A coin scale according to claim 4, wherein said coin receiving member includes at least one arcuate side wall and a notch so that coins can be piled inside the side wall and picked up through the notch.

6. A coin scale according to claim 5, wherein said mail receiving member includes two side walls to hold the mailing material therebetween.

7. A coin scale according to claim 4, wherein said first supporting device comprises an elongated through hole with a plurality of dents extending upwardly from the through hole, said dents operating as the supporting points, and said second supporting device is a rod extending through the through hole.

8. A coin scale according to claim 7, wherein said first supporting device further comprises a plurality of enlarged portions corresponding to the dents so that the weight of the elongated arm at the first supporting device does not change proportionally in the longitudinal direction of the arm.

9. A coin scale according to claim 4, wherein said first supporting device comprises two elongated side grooves and a plurality of dents laterally extending in the grooves, said dents operating as the supporting points, and said second supporting device comprises two depressions formed in the stand to face toward each other, two springs situated in the depressions, and two pins situated in the depressions and urged outwardly by the springs, said pins being situated in the grooves and engaging the dents.

* * * * *